Feb. 2, 1960
J. W. ORENDORFF
2,923,444
FLEXIBLE DRIVE FOR PLANTERS
Filed Jan. 22, 1958
2 Sheets-Sheet 1
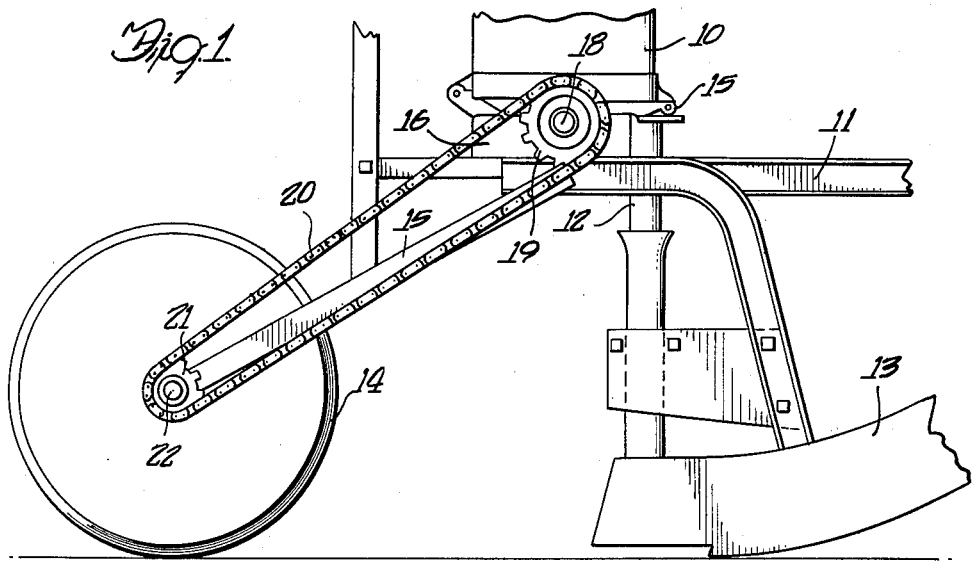
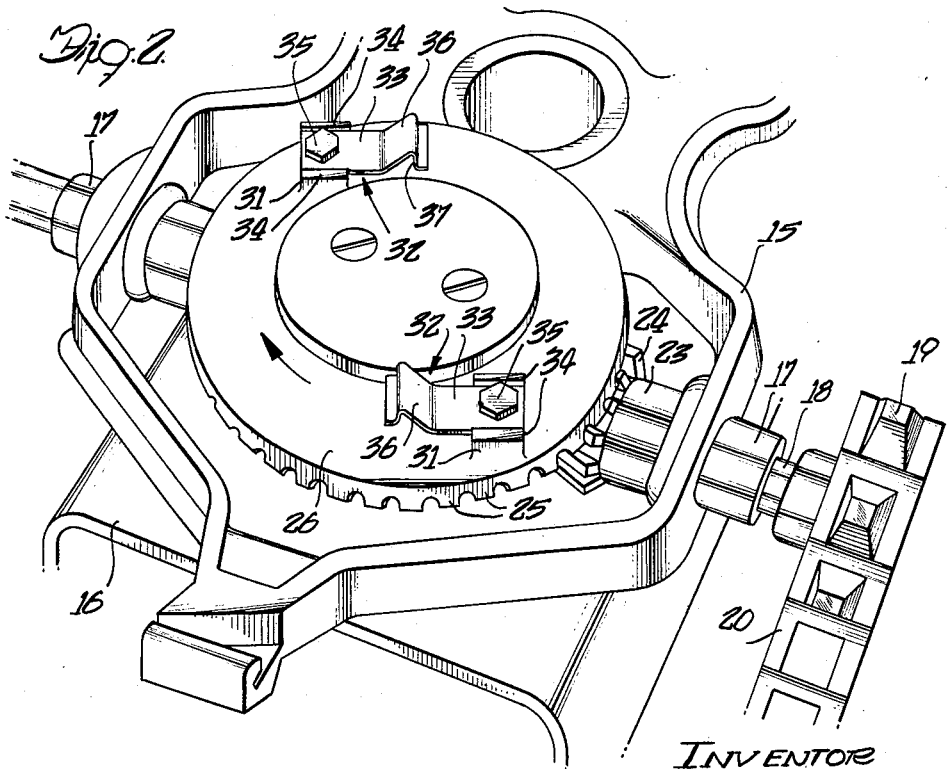
INVENTOR
JOHN W. ORENDORFF
ATTORNEY

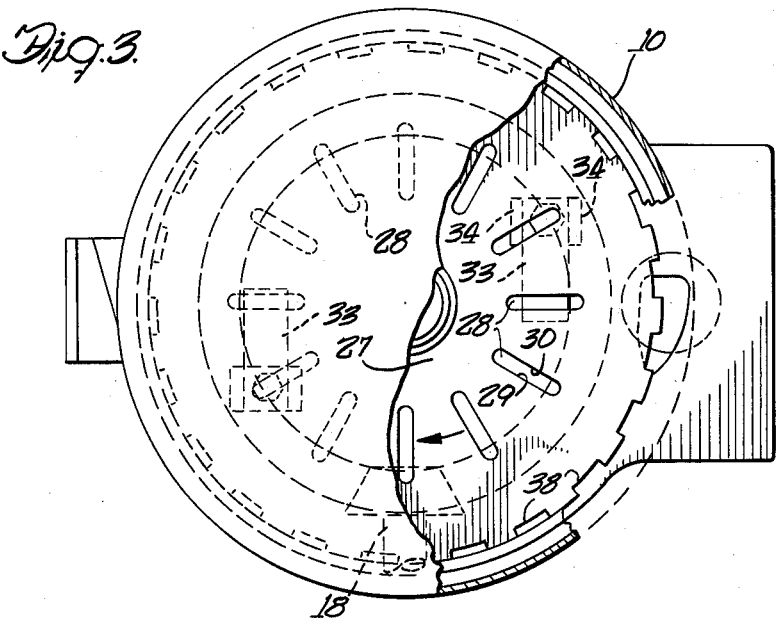
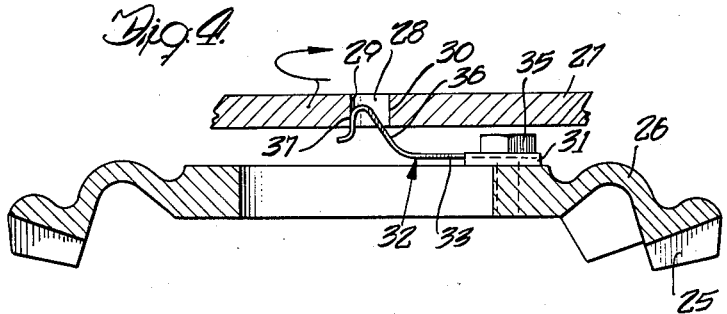
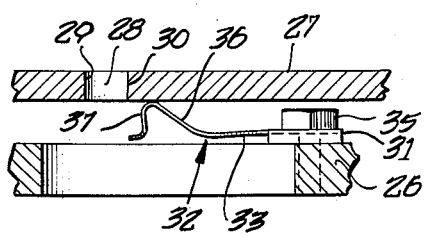

United States Patent Office 2,923,444
Patented Feb. 2, 1960

2,923,444

FLEXIBLE DRIVE FOR PLANTERS

John W. Orendorff, Canton, Ill., assignor to International Harvester Company, Chicago, Ill., a corporation of New Jersey Application January 22, 1958, Serial No. 710,520

3 Claims. (Cl. 222—410)

This invention relates to agricultural implements and particularly to planters and the like. More specifically the invention concerns novel driving apparatus for planters. The invention concerns especially a ground driven type of planter unit which forms one unit of a multi-row planter, a plurality of ground engaging planters being mounted side by side on a traveling support or frame.

When turning such a multi-row ground drive planter at the end of a field, it frequently happens that the ground engaging wheels of the planter unit or units near the center of the turning radius back up for at least part of the turn, reversing the direction of the rotatable dispensing elements. In a conventional type of planter wherein the seed plate has openings therein to receive driving lugs carried by a drive plate coaxial therewith, it sometimes happens that the driving lugs are broken off when the drive plate reverses. It likewise happens that the knocker finger, which is carried by the planter and adapted to enter the seed cells in the seed plate to dislodge the seed becomes broken off. Such damage means expensive repairs as well as loss of time until repairs are made.

The present invention was designed to overcome these difficulties and has for its object the provision of flexible driving lugs for the driving plate adapted to move out of driving engagement with the driven plate when the normal direction of rotation of the drive plate is reversed.

Another object of the invention is the provision, in a planter including a driven plate having openings therein and a drive plate having lugs thereon adapted for reception in said openings, of a spring steel member affixed at one end to the drive plate and having a bent portion receivable in the opening in the seed plate, wherein said bent portion has a right angled driving face engageable with one edge of said opening upon rotation of the drive plate in one direction and a slanted face engageable with the edge of the opening upon rotation of the drive plate in the other direction, whereby said bent portion is depressed out of driving engagement upon reversal of the drive mechanism.

Other objects and advantages of the invention will become clear from the following detailed description when read in conjunction with the accompanying drawings, wherein:

Figure 1 is a view in side elevation of a ground drive planter unit embodying the features of this invention;

Figure 2 is an enlarged view in perspective of a detail of the driving apparatus for the seed dispensing mechanism;

Figure 3 is a plan view on an enlarged scale, with parts broken away, of the seed can and showing the position of the seed plate therein;

Figure 4 is an enlarged sectional detail showing the relationship of the seed plate to the ring gear and the driving connection therebetween; and Figure 5 is a partial sectional view similar to Figure 4 showing the position of the driving member connecting the ring gear to the seed plate when the direction of rotation of the ring gear is reversed.

Figure 1 illustrates somewhat diagrammatically a typical ground driven planter unit. Customarily several such planter units are mounted at laterally spaced locations upon a tool support to form a multi-row planter. The planter assembly shown in Figure 1 comprises the usual seed container or can 10 mounted upon a supporting frame 11 and directing seed through a tube 12 to the furrow formed by an earthworking tool 13. A combination gauge and press wheel 14 is mounted on the frame 11 by any suitable means such as a carrier arm 15 and serves to drive the dispensing apparatus of the planter.

The planter unit includes a seed can support 15 mounted upon a bracket 16 secured to the frame 11 and having a pair of bearings 17 thereon adapted to rotatably support a transversely extending drive shaft 18. In general, the planting apparatus serving as a background for this invention is conventional and the basic elements described have been in use for years. The drive shaft 18 has mounted thereon a sprocket wheel 19 engaged by a chain 20, the other end of which is trained around a sprocket wheel 21 mounted on the wheel shaft 22 for wheel 14. Thus, by its engagement with the ground, wheel 14 rotates and drives the chain 20 and therefore shaft 18.

Also mounted on shaft 18 is a pinion 23 having teeth 24 thereon engageable with the teeth 25 of a ring gear 26 rotatably supported in any suitable way by the bracket 16 and serving as a drive plate for a seed plate 27 carried at the bottom of the seed container 10.

Seed plate 27 is provided with a plurality of circumferentially spaced slotted openings 28 each having a leading edge 29 and a trailing edge 30.

Projecting upwardly from the face of ring gear 26 are a pair of lugs 31, and to each lug is secured a spring steel driving member 32 made from flat spring steel stock having a main body portion 33 secured at one end to lug 31 between a pair of upwardly projecting shoulders 34, by means of a bolt 35.

Driving member 32 is inherently flexible and the body 33 thereof is parallel to the plane of ring gear 26. The other end of driving member 32 extending outwardly from lug 31 in the direction of rotation of ring gear 26, as indicated by the arrow in Figure 2, is bent upwardly to provide a slanted face 36 and downwardly to provide a generally vertical forward shoulder 37.

The upwardly projecting outer end of driving member 32 is received in one of the recesses or slots 28 in seed plate 27, and in the driving position of Figure 4 with the planter advancing over a field, the shoulder 37 engages the leading edge 29 of the recess 28 to drive the seed plate in the same direction as the rotation of drive plate 26.

As pointed out before, in a multi-row machine wherein a plurality of units such as that shown in Figure 1 are mounted at laterally spaced locations upon a supporting frame, it frequently happens when turning at the end of a field that one or more units near the center of the radius of rotation in turning tend to back up until the turn is completed. Under these circumstances the drive wheel 14 of the inner planter unit involved rotates backwardly and reverses the direction of revolution of ring gear 26. In a conventional planter of this type wherein lugs forming a part of the ring gear 26 and rigid therewith are received in the recesses 28 in the seed plate, the driving lugs are snapped off due to the inertia of the seed plate.

With the flexible drive member 32 of this invention, upon reversal of the direction of revolution of ring gear 26, the slanted face 36 of the driving projection at the end of member 32 engages the receding edge 30 of recess 28, the latter sliding upwardly along the inclined face 36 and depressing the member 32 to the position of Figure 5 out of the recess 28. When forward motion is again resumed, ring gear 26 rotates in the direction of the arrow until the driving member is again received in the recess 28 and shoulder 37 engages the leading edge 29 thereof to drive the seed plate in the same direction.

As long as shoulder 37 is engaging leading edge 29 of the recess, the direction of force is parallel to the main body 33 of the driving member 32, a force being directed downwardly parallel to the axis of ring gear 26 when the direction of rotation thereof is reversed.

It is believed that the novel driving mechanism of this invention will be clearly understood from the foregoing description. It should likewise be understood, however, that the invention has been described in its preferred embodiment only, and that modifications may be made therein without departing from the spirit of the invention or the scope of the appended claims.

What is claimed is:

1. In a planter, a driven seed plate having an opening therein radially spaced from the axis thereof, a rotatable drive plate coaxially arranged with respect to and in juxtaposition with said plate, and a flexible driving member mounted on said drive plate at a location adapted to register with and be received in the opening in the seed plate in driving relation therewith, comprising a leaf spring parallel to the face of said drive plate and anchored at one end thereto to accommodate flexing of the free end thereof parallel to the axis of said plate, and a projection on said free end adapted to extend into the opening in the seed plate, said projection having a leading edge parallel to the axis of said drive plate and engageable with the seed plate in said opening to drive the latter in one direction, the trailing edge of said projection being slanted relative to the leading edge thereof, said slanted edge being engageable with the seed plate in said opening upon reversing the direction of rotation of the drive plate and adapted to cause said drive member to flex in a direction to release said projection from said opening.

2. In a planter, a rotatable seed plate, a drive plate coaxially arranged with respect to said seed plate closely adjacent thereto, said seed plate having an opening therein at a location spaced from the axis thereof, and means driving the seed plate from the drive plate, comprising an elongated spring steel member anchored at one end to said drive plate, said spring steel member being disposed between said plates generally parallel thereto, the other end of said spring steel member being bent generally parallel to the axis of said plates for reception in said opening, said bent end being engageable with one edge of said opening to transmit to the seed plate the rotation of the drive plate.

3. The invention set forth in claim 2, wherein the end of said spring steel member is bent outwardly and then inwardly at right angles to the body of said member to provide a driving face parallel to the axis of said plates and engageable with one edge of said opening to transmit to the seed plate the rotation of the drive plate, and a slanted face engageable with the other edge of said opening when the direction of rotation of the drive plate is reversed.

References Cited in the file of this patent

UNITED STATES PATENTS

| | | |
|---|---|---|
| 113,776 | Kirkham | Apr. 18, 1871 |
| 253,889 | Roberts | Feb. 21, 1882 |
| 1,944,381 | Wamhoff | Jan. 23, 1934 |
| 2,705,428 | McCullough | Apr. 5, 1955 |